US012733073B2

(12) United States Patent
Mawake

(10) Patent No.: US 12,733,073 B2
(45) Date of Patent: Sep. 8, 2026

(54) LIGHTING CONTROL CIRCUIT, PASSENGER DETECTION DEVICE, LIGHTING CONTROL METHOD, AND PASSENGER DETECTION METHOD

(71) Applicant: Mitsubishi Electric Corporation, Tokyo (JP)

(72) Inventor: Nobuaki Mawake, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 51 days.

(21) Appl. No.: 18/992,728

(22) PCT Filed: Aug. 25, 2022

(86) PCT No.: PCT/JP2022/031970
§ 371 (c)(1),
(2) Date: Jan. 9, 2025

(87) PCT Pub. No.: WO2024/042666
PCT Pub. Date: Feb. 29, 2024

(65) Prior Publication Data
US 2026/0013017 A1 Jan. 8, 2026

(51) Int. Cl.
*H05B 45/375* (2020.01)
*H05B 45/345* (2020.01)
*H05B 47/125* (2020.01)

(52) U.S. Cl.
CPC ......... *H05B 45/375* (2020.01); *H05B 45/345* (2020.01); *H05B 47/125* (2020.01)

(58) Field of Classification Search
CPC .. H05B 45/375; H05B 45/345; H05B 47/125; Y02B 20/40
See application file for complete search history.

(56) References Cited

U.S. PATENT DOCUMENTS 9,781,789 B1 * 10/2017 Lee ........................ H05B 45/10
9,986,611 B2 * 5/2018 Takagimoto ........... H05B 45/37

FOREIGN PATENT DOCUMENTS

JP 2011-87389 A 4/2011
JP 2015-167213 A 9/2015
JP 2016-139544 A 8/2016

OTHER PUBLICATIONS

International Search Report (PCT/ISA/210) Issued in PCT/JP2022/031970, dated Oct. 11, 2022.

* cited by examiner

*Primary Examiner* — Daniel D Chang
(74) *Attorney, Agent, or Firm* — Birch, Stewart, Kolasch & Birch, LLP

(57) ABSTRACT

A lighting control circuit includes: a light emitting element connected between a first terminal and a second terminal; a converter that converts a direct current input voltage into a first direct current output voltage or a second direct current output voltage, in which when a monitor determines that the direct current input voltage is higher than a predetermined threshold, a first switch disconnects the first terminal from a ground potential, a second switch connects the second terminal with the ground potential, and the converter outputs the first direct current output voltage to the first terminal, and when the monitor does not determine that the direct current input voltage is higher than the predetermined threshold, the first switch connects the first terminal with the ground potential, the second switch disconnects the second terminal from the ground potential, and the converter outputs the second direct current output voltage to the second terminal.

6 Claims, 5 Drawing Sheets

LIGHTING CONTROL CIRCUIT, PASSENGER DETECTION DEVICE, LIGHTING CONTROL METHOD, AND PASSENGER DETECTION METHOD

TECHNICAL FIELD

The present disclosure relates to a lighting control circuit, a passenger detection device, a lighting control method, and a passenger detection method.

BACKGROUND ART

A DC-DC converter that drives light emitting elements that are examples of loads and is described in Patent Literature 1 outputs at least one of a first voltage that has a reverse polarity to that of an input voltage, and a second voltage that has the same polarity as that of the input voltage. For example, the above DC-DC converter mounted on a vehicle includes, for example, a booster circuit that is a boost chopper to make it possible to output the above second voltage even when the above input voltage lowers due to fluctuation of a voltage of a vehicle battery.

CITATION LIST

Patent Literature

Patent Literature 1: JP 2011-87389 A

SUMMARY OF INVENTION

Technical Problem

However, as is conventionally known, the above boost chopper includes, for example, at least a coil, a capacitor, and diodes, and therefore there has been a problem that the size of the above DC-DC converter mounted on the vehicle is larger, and the cost of the DC-DC converter is high, due to the presence of the above coil or the like.

An object of the present disclosure is to provide a lighting control circuit, a passenger detection device, a lighting control method, and a passenger detection method that can suppress an increase in the size of a circuit and an increase in cost of the circuit due to including a conventional boost chopper.

Solution to Problem

To solve the above problem, a lighting control circuit according to the present disclosure includes: at least one light emitting element connected between a first terminal and a second terminal; a first switch to connect or disconnect the first terminal with or from a ground potential; a second switch to connect or disconnect the second terminal with or from the ground potential; a converter to selectively perform: converting a direct current input voltage into a first direct current output voltage having a same polarity as a polarity of the direct current input voltage and having magnitude capable of driving the light emitting element, and outputting the first direct current output voltage to the first terminal; and converting the direct current input voltage into a second direct current output voltage having a reverse polarity to the polarity of the direct current input voltage and having the magnitude capable of driving the light emitting element, and outputting the second direct current output voltage to the second terminal; and a monitor to monitor magnitude of the direct current input voltage, when the monitor determines that the direct current input voltage is higher than a predetermined threshold voltage, the first switch disconnects the first terminal from the ground potential, the second switch connects the second terminal with the ground potential, and the converter outputs the first direct current output voltage to the first terminal, and when the monitor does not determine that the direct current input voltage is higher than the predetermined threshold voltage, the first switch connects the first terminal with the ground potential, the second switch disconnects the second terminal from the ground potential, and the converter outputs the second direct current output voltage to the second terminal.

Advantageous Effects of Invention

A lighting control circuit according to the present disclosure can suppress an increase in the size and an increase in cost due to including a conventional boost chopper.

DESCRIPTION OF EMBODIMENTS

Embodiment

An embodiment of a lighting control circuit according to the present disclosure will be described.

Function of Embodiment

Figure 1:
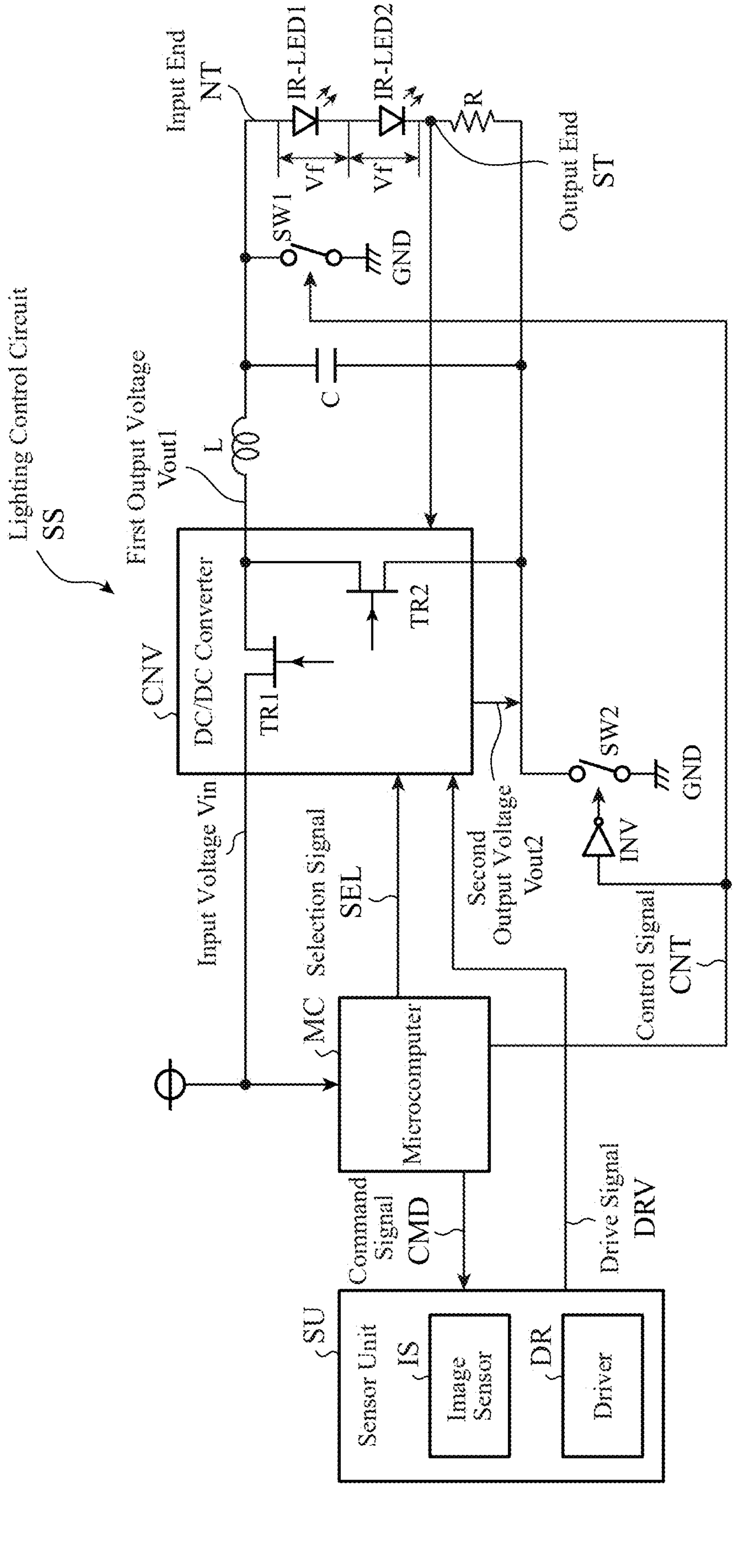
FIG. 1 is a functional block diagram of a lighting control circuit SS according to an embodiment.

FIG. 1 is a functional block diagram of a lighting control circuit SS according to the embodiment. Hereinafter, the function of the lighting control circuit SS according to the embodiment will be described with reference FIG. 1.

As illustrated in FIG. 1, the lighting control circuit SS according to the embodiment includes a DC/DC converter CNV, a coil L, a capacitor C, a first infrared light emitting element IR-LED1, a second infrared light emitting element IR-LED2, a resistor R, a first switch SW1, a second switch SW2, an inverter INV, a microcomputer MC, and a sensor unit SU.

The DC/DC converter CNV corresponds to a “converter”, the first infrared light emitting element IR-LED1 and the second infrared light emitting element IR-LED2 correspond to “light emitting elements”, the first switch SW1 corresponds to a “first switch”, the second switch SW2 corresponds to a “second switch”, and the microcomputer MC corresponds to a “monitor”.

The DC/DC converter CNV is a buck type. As illustrated in FIG. 1, the DC/DC converter CNV includes a first transistor TR1 and a second transistor TR2 similarly to a conventionally known technique. Similarly to the conventionally known technique, by switching of the first transistor TR1 and the second transistor TR2, the DC/DC converter CNV converts an input voltage Vin (e.g., the voltage of a battery mounted on a vehicle) into a first output voltage Vout1 and outputs the first output voltage Vout1 to an input end NT, and, on the other hand, converts the input voltage Vin into a second output voltage Vout2 and outputs the second output voltage Vout2 to an output end ST.

The input end NT corresponds to a "first terminal", and the output end ST corresponds to a "second terminal".

The DC/DC converter CNV selectively outputs the above first output voltage Vout1 to the input end NT and outputs the above second output voltage Vout2 to the output end ST in accordance with a selection signal SEL from the microcomputer MC.

The first output voltage Vout1 has the same polarity as that of the input voltage Vin. The second output voltage Vout2 has the reverse polarity to that of the input voltage Vin. An absolute value of the first output voltage Vout1 and an absolute value of the second output voltage Vout2 have magnitude that can drive the first infrared light emitting element IR-LED1 and the second infrared light emitting element IR-LED2 mutually connected in series.

In FIG. 1, Vf represents a forward drop voltage of the first infrared light emitting element IR-LED1 and a forward drop voltage of the second infrared light emitting element IR-LED2. The absolute value of the first output voltage Vout1 and the absolute value of the second output voltage Vout2 are at least (Vf×2).

Since the DC/DC converter CNV is the above buck type, the absolute value of the first output voltage Vout1 and the absolute value of the second output voltage Vout2 are smaller than an absolute value of the input voltage Vin.

The coil L and the capacitor C are provided on an output side of the DC/DC converter CNV. More specifically, (1) one end of the coil L (an end of an input side) is connected to the DC/DC converter CNV, (2) the other end of the coil L (an end of the output side) and one end of the capacitor C are mutually connected, and (3) the other end of the capacitor C is connected to a ground potential GND. The coil L and the capacitor C smooth the first output voltage Vout1 output from the DC/DC converter CNV similarly to the conventionally known technique.

The first infrared light emitting element IR-LED1 and the second infrared light emitting element IR-LED2 are mutually connected in series as illustrated in FIG. 1 and as described above. More specifically, (1) one end of the first infrared light emitting element IR-LED1 (an end of an anode side) is connected to the other end of the coil L and the one end of the capacitor C, (2) the other end of the first infrared light emitting element IR-LED1 (an end of a cathode side) and one end of the second infrared light emitting element IR-LED2 (an end of an anode side) are mutually connected, and (3) the other end of the second infrared light emitting element IR-LED2 (an end of a cathode side) connects the resistor R to the other end of the capacitor C. In other words, the first infrared light emitting element IR-LED1 and the second infrared light emitting element IR-LED2 are connected in series to the above coil L and connected in parallel to the above capacitor C.

As illustrated in FIG. 1, the above-described input end NT is the one end of the first infrared light emitting element IR-LED1 (the end of the anode side), and the above-described output end ST is the other end of the second infrared light emitting element IR-LED2 (the end of the cathode side).

The resistor R is connected to the above first infrared light emitting element IR-LED1 and second infrared light emitting element IR-LED2 in series as illustrated in FIG. 1 to monitor the voltage of the output end ST. Depending on whether the voltage of the output end ST is larger or small, the DC/DC converter CNV changes, for example, the magnitude of the first output voltage Vout1, and thereby causes a constant current to flow to the first infrared light emitting element IR-LED1 and the second infrared light emitting element IR-LED2.

As illustrated in FIG. 1, the first switch SW1 is connected between the input end NT and the ground potential GND.

As illustrated in FIG. 1, the second switch SW2 is connected between the output end ST and the ground potential GND.

As illustrated in FIG. 1, the inverter INV receives an input of an control signal CNT from the microcomputer MC, inverts the control signal CNT, and outputs the control signal CNT to the second switch SW2. The control signal CNT and the control signal CNT inverted by the inverter INV control an operation of the first switch SW1 and an operation of the second switch SW2 in such a manner that both of the operations are opposite to each other (e.g., the first switch SW1 is blocked and the second switch SW2 is conducted).

As illustrated in FIG. 1, the microcomputer MC monitors the magnitude of the input voltage Vin, and outputs the selection signal and a command signal CMD depending on a result of the monitoring.

When it is determined that the input voltage Vin is higher than a predetermined threshold voltage Vth (illustrated in FIG. 5), the microcomputer MC (1) outputs to the DC/DC converter CNV the selection signal SEL indicating that the first output voltage Vout1 needs to be generated, (2) outputs to the sensor unit SU the command signal CMD indicating that it is determined that the input voltage Vin is higher than the threshold voltage Vth, and (3) outputs to the first switch SW1 and the second switch SW2 the control signal CNT for blocking the first switch SW1 and conducting the second switch SW2.

By contrast with this, when it is not determined that the input voltage Vin is higher than the threshold voltage Vth, the microcomputer MC (1) outputs to the DC/DC converter CNV the selection signal SEL indicating that the second output voltage Vout2 needs to be generated, (2) outputs to the sensor unit SU the command signal CMD indicating that it is not determined that the input voltage Vin is higher than the threshold voltage Vth, and (3) outputs to the first switch SW1 and the second switch SW2 the control signal CNT for conducting the first switch SW1 and blocking the second switch SW2.

As illustrated in FIG. 1, the sensor unit SU includes, for example, an image sensor IS and a driver DR. The sensor unit SU implements an image detection function using the image sensor IS similarly to the conventionally known technique, and outputs to the DC/DC converter CNV a drive signal DRV (also illustrated in FIG. 5) for driving the DC/DC converter CNV using the driver DR when receiving the above command signal CMD from the microcomputer MC.

Configuration According to Embodiment

Figure 2:
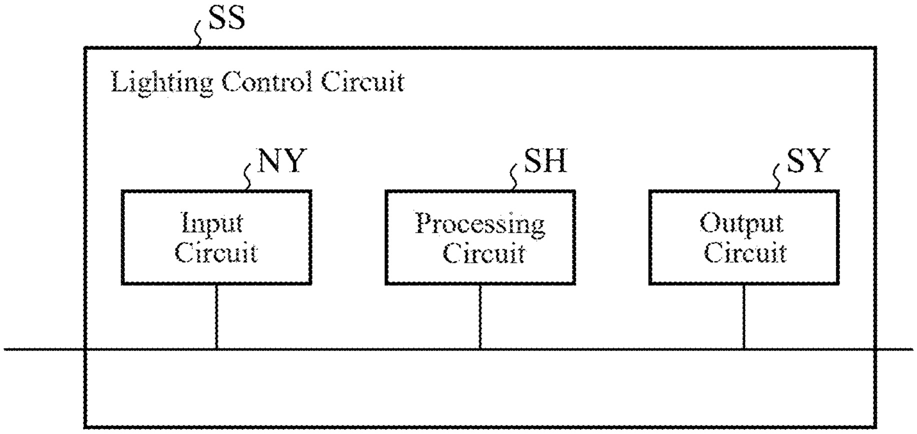
FIG. 2 illustrates a hardware configuration of the lighting control circuit SS according to the embodiment.

FIG. 2 illustrates a hardware configuration of the lighting control circuit SS according to the embodiment.

As illustrated in FIG. 2, the lighting control circuit SS includes a processing circuit SH, and further includes an input circuit NY and an output circuit SY as needed.

The processing circuit SH is dedicated hardware. The processing circuit SH implements the functions (the functions of the microcomputer MC and the sensor unit SU (illustrated in FIG. 1) in particular) of the lighting control circuit SS.

The processing circuit SH is, for example, a single circuit, a composite circuit, a programmed processor, a parallel-programmed processor, an Application Specific Integrated Circuit (ASIC), a Field-Programmable Gate Array (FPGA), or a combination thereof.

The input circuit NY and the output circuit SY exchange an input and an output related to the operation of the processing circuit SH with the outside of the lighting control circuit SS, for example.

Figure 3:
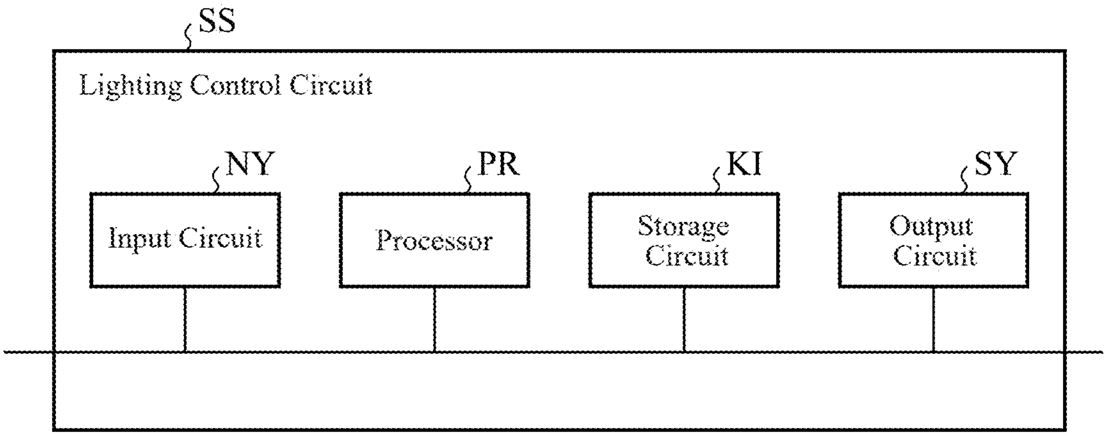
FIG. 3 illustrates a hardware configuration of the lighting control circuit SS according to the embodiment based on implementation by software.

FIG. 3 illustrates a hardware configuration of the lighting control circuit SS according to the embodiment based on implementation by software.

As illustrated in FIG. 3, the lighting control circuit SS includes a processor PR and a storage circuit KI, and further includes the input circuit NY and the output circuit SY as needed.

The processor PR is a CPU (that is also referred to as a Central Processing Unit, a central processing device, a processing device, an arithmetic operation device, a microprocessor, a microcomputer, or a Digital Signal Processor (DSP)) that executes programs. The processor PR implements the functions (the functions of the microcomputer MC and the sensor unit SU (illustrated in FIG. 1) in particular) of the lighting control circuit SS.

The processor PR implements the above functions by software, firmware, or a combination of software and firmware. The software and the firmware are described as programs, and stored in the storage circuit KI.

The processor PR implements the above functions by reading and executing the above programs stored in the storage circuit KI. The above programs may cause a computer to execute a procedure and a method of each function of the lighting control circuit SS.

Here, examples of the storage circuit KI include a non-volatile or volatile semiconductor memory such as a Random Access Memory (RAM), a Read Only Memory (ROM), a flash memory, an Erasable Programmable Read Only Memory (EPROM), or an Electrically Erasable Programmable Read-Only Memory (EEPROM), a magnetic disk, a flexible disk, an optical disk, a compact disk, a mini disk, and a Digital Versatile Disc (DVD).

As described above, the functions of the lighting control circuit SS can be implemented by hardware, software, firmware, or a combination thereof.

The input circuit NY and the output circuit SY exchange an input and an output related to the operation of the processor PR with the outside of the lighting control circuit SS, for example.

Part of the functions of the lighting control circuit SS may be implemented by the processing circuit SH (illustrated in FIG. 2), and, on the other hand, other part of the functions may be implemented by the processor PR (illustrated in FIG. 3).

Operation According to Embodiment

The operation of the lighting control circuit SS according to the embodiment will be described.

Figure 4:
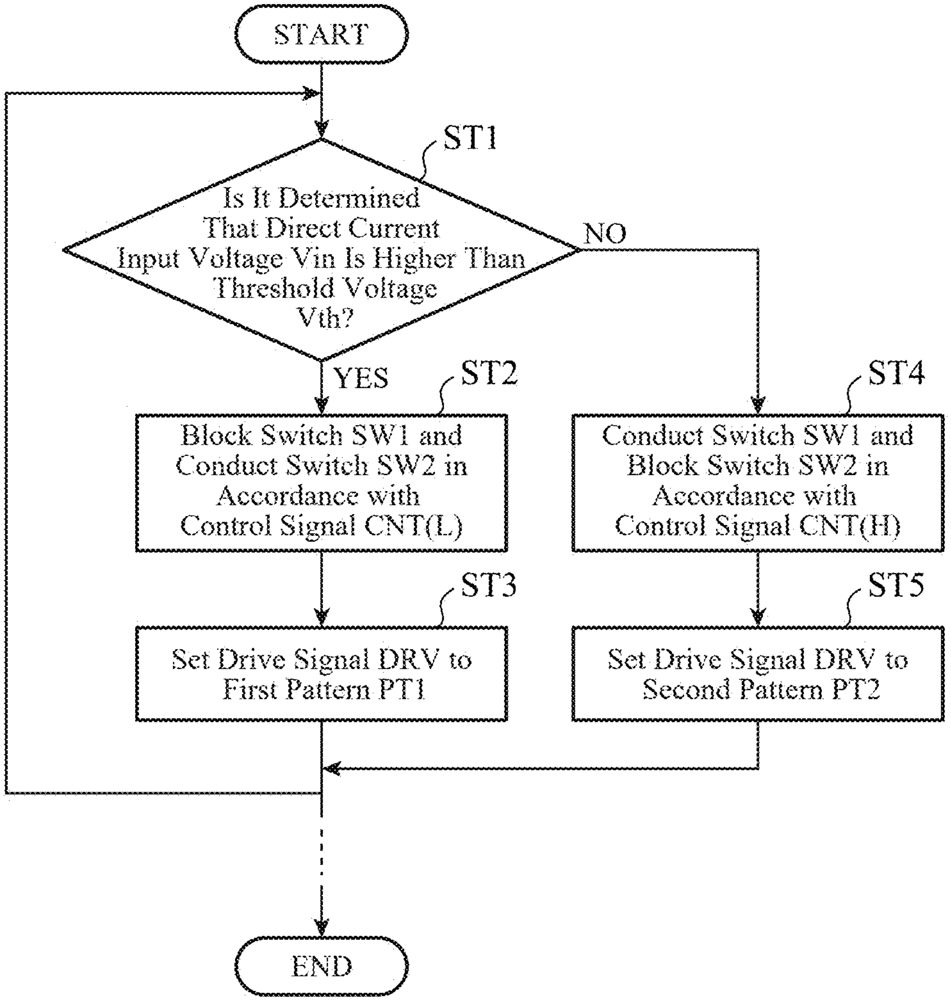
FIG. 4 is a flowchart illustrating an operation of the lighting control circuit SS according to the embodiment.

FIG. 4 is a flowchart illustrating the operation of the lighting control circuit SS according to the embodiment.

Figure 5:
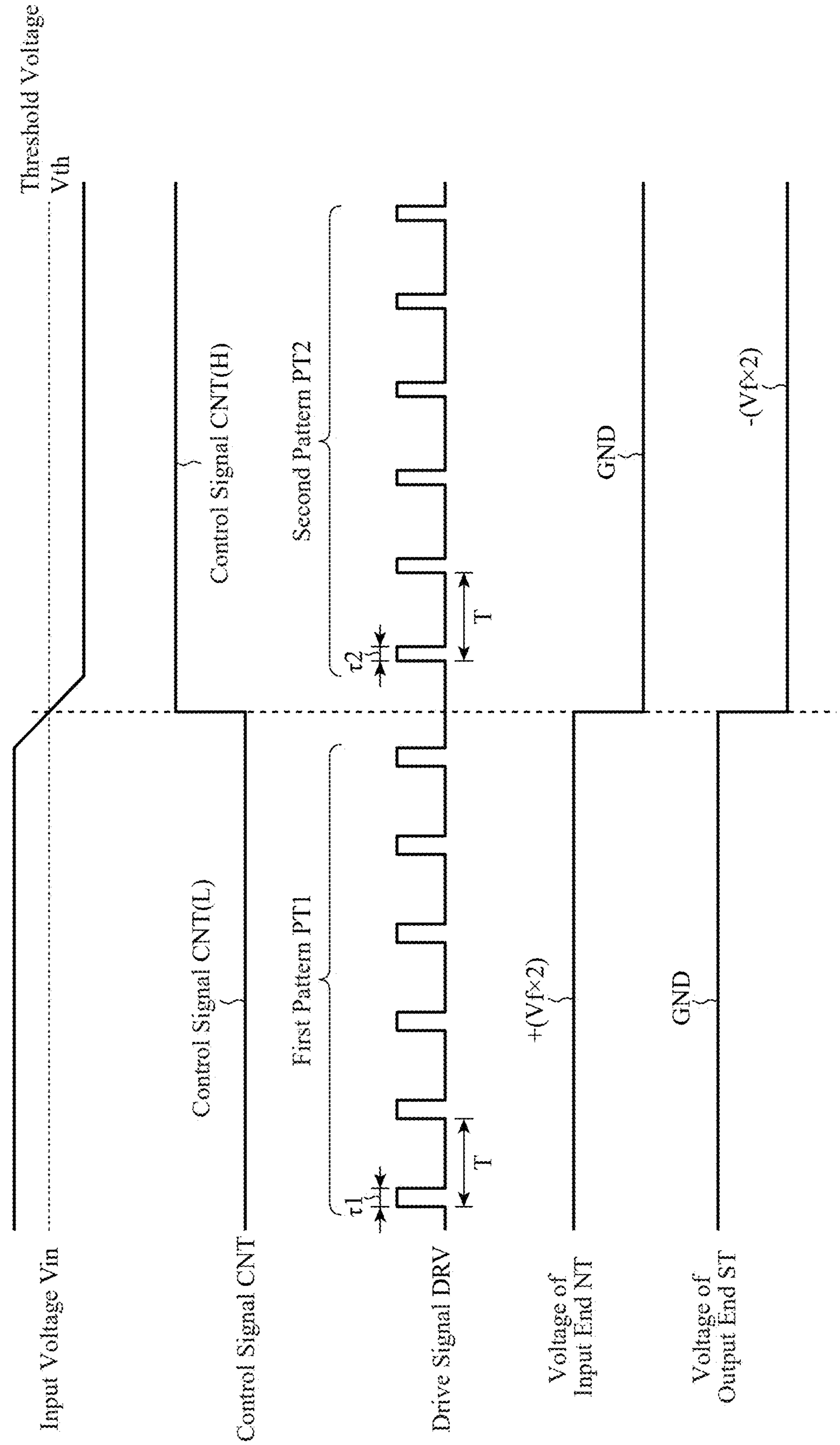
FIG. 5 is a time chart illustrating the operation of the lighting control circuit SS according to the embodiment.

FIG. 5 is a time chart illustrating the operation of the lighting control circuit SS according to the embodiment.

Hereinafter, the operation of the lighting control circuit SS according to the embodiment will be described with reference to the flowchart in FIG. 4 and the time chart in FIG. 5.

<Comparison Between Input Voltage Vin and Threshold Voltage Vth>

Step ST1: When the microcomputer MC (illustrated in FIG. 1) compares the input voltage Vin (illustrated in FIGS. 1 and 5) and the predetermined threshold voltage Vth (illustrated in FIG. 5).

When it is determined that the input voltage Vin is higher than the threshold voltage Vth, the microcomputer MC outputs to the sensor unit SU (illustrated in FIG. 1) the command signal CMD (illustrated in FIG. 1) indicating that "it is determined that the input voltage Vin is higher than the threshold voltage Vth". On the other hand, when it is not determined that the input voltage Vin is higher than the threshold voltage Vth, the microcomputer MC outputs to the sensor unit SU the command signal CMD indicating that "it is not determined that the input voltage Vin is higher than the threshold voltage Vth".

Here, the phrase "when it is determined that the input voltage Vin is higher than the threshold voltage Vth" basically means the time at which the input voltage Vin is higher than the threshold voltage Vth, and additionally means that the phrase may or may not include a time at which the input voltage Vin is the same as the threshold voltage Vth.

When it is determined that the input voltage Vin is higher than the threshold voltage Vth, processing moves to step ST2, and, on the other hand, when it is not determined that the input voltage Vin is higher than the threshold voltage Vth, the processing moves to step ST4.

<Generation of First Output Voltage Vout1>

Step ST2: The microcomputer MC outputs to the DC/DC converter CNV the selection signal SEL indicating that "the first output voltage Vout1 needs to be generated", and outputs to the first switch SW1 (illustrated in FIG. 1) and the second switch SW2 (illustrated in FIG. 1) the control signal CNT (illustrated in FIGS. 1 and 5) indicating that "the first switch SW1 is blocked and the second switch SW2 is conducted", that is, the control signal CNT (L)

In response to the above control signal CNT (L), the first switch SW1 is blocked and, as a result of the block, the input end NT (illustrated in FIG. 1) is disconnected from the ground potential GND, and, on the other hand, the second switch SW2 is conducted and, as a result of the conduction, the output end ST (illustrated in FIG. 1) is connected to the ground potential GND.

Step ST3: It is determined that the input voltage Vin is higher than the threshold voltage Vth, and thus the microcomputer MC outputs the selection signal SEL (illustrated in FIG. 1) indicating that "the first output voltage Vout1 needs to be generated".

When the sensor unit SU receives from the microcomputer MC the command signal CMD indicating that "it is determined that the input voltage Vin is higher than the threshold voltage Vth", outputs the drive signal DRV (illustrated in FIGS. 1 and 5) to the DC/DC converter CNV, and, moreover, sets a mode of the drive signal DRV to a first pattern PT1 (illustrated in FIG. 5).

Here, as illustrated in FIG. 5, in the first pattern PT1, a cycle (unit period) of the drive signal DRV is represented by T, and an on time of the drive signal DRV, in other words, a time during which the DC/DC converter CNV is in an operable state is represented by $\tau 1$.

Under conditions that (1) the input end NT is disconnected from the ground potential GND and the output end ST is connected to the ground potential GND, (2) the selection signal SEL indicating that "the first output voltage Vout1 needs to be generated" is received, and (3) the drive signal DRV of the first pattern PT1 is applied to the DC/DC converter CNV, the DC/DC converter CNV outputs the first output voltage Vout1 having the magnitude of +(Vf×2) to the input end NT as illustrated in FIG. 5.

Thus, a voltage whose absolute value is (Vf×2) is applied between the input end NT and the output end ST, in other words, between the anode terminal of the first infrared light emitting element IR-LED1 and the cathode terminal of the second infrared light emitting element IR-LED2 connected in series.

<Generation of Second Output Voltage Vout2>

Step ST4: The microcomputer MC outputs to the DC/DC converter CNV the selection signal SEL indicating that "the second output voltage Vout2 needs to be generated", outputs to the first switch SW1 (illustrated in FIG. 1) and the second switch SW2 (illustrated in FIG. 1) the control signal CNT (illustrated in FIGS. 1 and 5) indicating that "the first switch SW1 is conducted and the second switch SW2 is blocked", that is, the control signal CNT (H).

In response to the above control signal CNT (H), the first switch SW1 is conducted and, as a result of the conduction, the input end NT (illustrated in FIG. 1) is connected to the ground potential GND, and, on the other hand, the second switch SW2 is blocked and, as a result of the block, the output end ST (illustrated in FIG. 1) is disconnected from the ground potential GND.

Step ST5: It is not determined that the input voltage Vin is higher than the threshold voltage Vth, and thus the microcomputer MC outputs the selection signal SEL (illustrated in FIG. 1) indicating that "the second output voltage Vout2 needs to be generated".

When the sensor unit SU receives from the microcomputer MC the command signal CMD indicating that "it is not determined that the input voltage Vin is higher than the threshold voltage Vth", outputs the drive signal DRV (illustrated in FIGS. 1 and 5) to the DC/DC converter CNV, and, moreover, sets a mode of the drive signal DRV to a second pattern PT2 (illustrated in FIG. 5).

Here, as illustrated in FIG. 5, similarly to the first pattern PT1, in the second pattern PT2, the cycle (unit period) of the drive signal DRV is represented by T, and, on the other hand, unlike the first pattern PT1, the on time of the drive signal DRV is represented by t2 shorter than t1 of the first pattern PT1.

Under conditions that (1) the input end NT is connected to the ground potential GND and the output end ST is disconnected from the ground potential GND, (2) the selection signal SEL indicating that "the second output voltage Vout2 needs to be generated" is received, and (3) the drive signal DRV of the second pattern PT2 is applied to the DC/DC converter CNV, the DC/DC converter CNV outputs the second output voltage Vout2 having the magnitude of −(Vf×2) to the output end ST as illustrated in FIG. 5.

Thus, a voltage whose absolute value is (Vf×2) is applied between the input end NT and the output end ST, in other words, between the anode terminal of the first infrared light emitting element IR-LED1 and the cathode terminal of the second infrared light emitting element IR-LED2 connected in series similarly to above-described step ST3.

Even when a voltage difference between the input voltage Vin and the second output voltage Vout2 is, for example, remarkably large compared to a voltage difference between the input voltage Vin and the first output voltage Vout1, the on time t2 (illustrated in FIG. 5) of the second pattern PT2 is shorter than the on time t1 (illustrated in FIG. 5) of the first pattern PT1 as described above. Consequently, it is possible to slow the operation of the DC/DC converter CNV for generating the second output voltage Vout2 compared to the operation of the DC/DC converter CNV for generating the first output voltage Vout1. As a result, it is possible to reduce the amount of heat generation that accompanies generation of the second output voltage Vout2 performed by the DC/DC converter CNV.

Effect of Embodiment

As described above, in the lighting control circuit SS according to the embodiment, when it is determined that the input voltage Vin is larger than the threshold voltage Vth, the microcomputer MC connects the output end ST to the ground potential GND, and the DC/DC converter CNV outputs the first output voltage Vout1 that is +(Vf×2) to the input end NT.

By contrast with this, when it is not determined that the input voltage Vin is larger than the threshold voltage Vth, the input end NT is connected to the ground potential GND, and then the DC/DC converter CNV outputs the second output voltage Vout2 that is −(Vf×2) to the output end ST.

By selectively outputting the first output voltage Vout1 and the second output voltage Vout2, it is possible to apply the voltage whose absolute value is (Vf×2) between the input end NT and the output end ST of the first infrared light emitting element IR-LED1 and the second infrared light emitting element IR-LED2 mutually connected in series irrespectively of whether it is determined or is not determined that the input voltage Vin is higher than the threshold voltage Vth.

Moreover, selectively outputting the first output voltage Vout1 and the second output voltage Vout2 as described above does not require a boost chopper (including a coil, a capacitor, and diodes) that has been conventionally required, so that it is possible to suppress an increase in the size of a circuit and an increase in cost of the circuit caused because the boost chopper has been necessary.

In the lighting control circuit SS according to the embodiment, the on time t2 of the second pattern PT2 of the drive signal DRV output by the sensor unit SU to cause the DC/DC converter CNV to generate the latter second output voltage Vout2 that is −(Vf×2) is shorter than the on time t1 of the first pattern PT1 of the drive signal DRV output to cause the DC/DC converter CNV to generate the former first output voltage Vout1 that is +(Vf×2). Consequently, it is possible to reduce an increase in the amount of heat generation caused when the voltage difference between the input voltage Vin and the second output voltage Vout2 is remarkably large.

Modified Example

Figure 6:
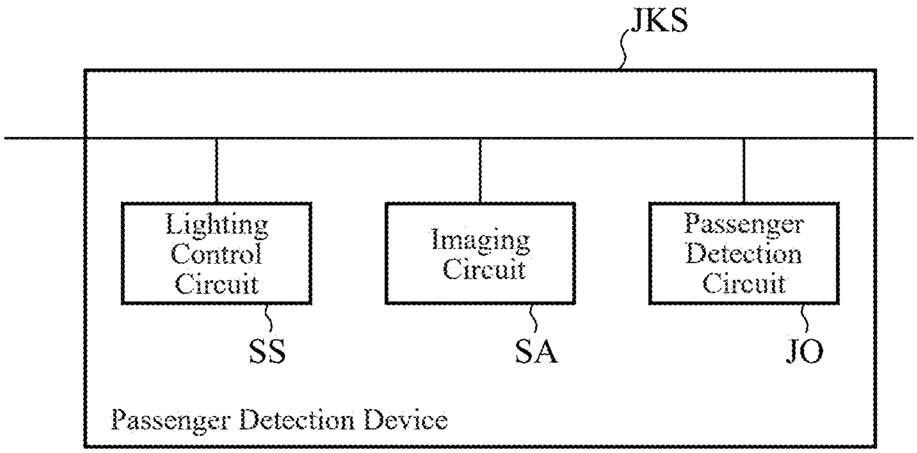
FIG. 6 illustrates a configuration of a passenger detection device JKS according to a modified example of the embodiment.

FIG. 6 illustrates a configuration of a passenger detection device JKS according to a modified example of the embodiment.

As illustrated in FIG. 6, the passenger detection device JKS according to the modified example includes the above-described lighting control circuit SS according to the embodiment, an imaging circuit SA, and a passenger detection circuit JO.

The passenger detection device JKS is mounted on, for example, a vehicle SR (not illustrated) or the like. In the passenger detection device JKS, under a condition that the lighting control circuit SS (illustrated in FIGS. 1 and 6)

cause the first infrared light emitting element IR-LED1 (illustrated in FIG. 1) and the second infrared light emitting element IR-LED2 (illustrated in FIG. 1) to emit light, the imaging circuit SA captures, for example, an image GZ (not illustrated) of a vehicle interior of the vehicle SR, and the passenger detection circuit JO detects a passenger such as a driver or a passenger on a passenger seat on the basis of the image GZ.

It is possible to modify any component in the embodiment, or omit any component in the embodiment.

INDUSTRIAL APPLICABILITY

A lighting control circuit according to the present disclosure can be used to suppress an increase in the size of a circuit and an increase in cost of the circuit due to including a conventionally boost chopper.

REFERENCE SIGNS LIST

C: capacitor, CMD: command signal, CNT: control signal, CNV: DC/DC converter, DR: driver, DRV: drive signal, GND: ground potential, INV: inverter, IR-LED1: first infrared light emitting element, IR-LED2: second infrared light emitting element, IS: image sensor, JKS: passenger detection device, JO: passenger detection circuit, KI: storage circuit, L: coil, MC: microcomputer, NT: input end, NY: input circuit, PR: processor, PT1: first pattern, PT2: second pattern, R: resistor, SA: imaging circuit, SEL: selection signal, SH: processing circuit, SS: lighting control circuit, ST: output end, SU: sensor unit, SW1: first switch, SW2: second switch, SY: output circuit, TR1: first transistor, TR2: second transistor, Vin: input voltage, Vout1: first output voltage, Vout2: second output voltage, Vth: threshold voltage

The invention claimed is:

1. A lighting control circuit comprising:

at least one light emitting element connected between a first terminal and a second terminal;

a first switch to connect or disconnect the first terminal with or from a ground potential;

a second switch to connect or disconnect the second terminal with or from the ground potential;

a converter to selectively perform: converting a direct current input voltage into a first direct current output voltage having a same polarity as a polarity of the direct current input voltage and having magnitude capable of driving the light emitting element, and outputting the first direct current output voltage to the first terminal; and converting the direct current input voltage into a second direct current output voltage having a reverse polarity to the polarity of the direct current input voltage and having the magnitude capable of driving the light emitting element, and outputting the second direct current output voltage to the second terminal; and a monitor to monitor magnitude of the direct current input voltage, wherein when the monitor determines that the direct current input voltage is higher than a predetermined threshold voltage, the first switch disconnects the first terminal from the ground potential, the second switch connects the second terminal with the ground potential, and the converter outputs the first direct current output voltage to the first terminal, and when the monitor does not determine that the direct current input voltage is higher than the predetermined threshold voltage, the first switch connects the first terminal with the ground potential, the second switch disconnects the second terminal from the ground potential, and the converter outputs the second direct current output voltage to the second terminal.

2. The lighting control circuit according to claim 1, wherein the converter converts the direct current input voltage into the second direct current output voltage in such a manner that a time per unit period for converting the direct current input voltage into the second direct current output voltage is shorter than a time per unit period for converting the direct current input voltage into the first direct current output voltage.

3. A passenger detection device comprising:

the lighting control circuit according to claim 1;

an imaging circuit to capture an image of an interior of a vehicle while the light emitting element emits light under control by the lighting control circuit; and a passenger detection circuit to detect a passenger in the vehicle on a basis of the image.

4. A lighting control method comprising:

connecting or disconnecting, with or from a ground potential, a first terminal among the first terminal and a second terminal between which at least one light emitting element is connected;

connecting or disconnecting the second terminal with or from the ground potential;

selectively performing: converting a direct current input voltage into a first direct current output voltage having a same polarity as a polarity of the direct current input voltage and having magnitude capable of driving the light emitting element, and outputting the first direct current output voltage to the first terminal; and converting the direct current input voltage into a second direct current output voltage having a reverse polarity to the polarity of the direct current input voltage and having the magnitude capable of driving the light emitting element, and outputting the second direct current output voltage to the second terminal; and monitoring magnitude of the direct current input voltage, wherein when it is determined that the direct current input voltage is higher than a predetermined threshold voltage, the first terminal is disconnected from the ground potential, the second terminal is connected with the ground potential, and the first direct current output voltage is output to the first terminal, and when it is not determined that the direct current input voltage is higher than the predetermined threshold voltage, the first terminal is connected with the ground potential, the second terminal is disconnected from the ground potential, and the second direct current output voltage is output to the second terminal.

5. The lighting control method according to claim 4, wherein the direct current input voltage is converted into the second direct current output voltage in such a manner that a time per unit period for converting the direct current input voltage into the second direct current output voltage is shorter than a time per unit period for converting the direct current input voltage into the first direct current output voltage.

6. A passenger detection method comprising:

causing the light emitting element to emit light by the lighting control method according to claim 4;

capturing an image of an interior of a vehicle while the light emitting element emits the light; and detecting a passenger in the vehicle on a basis of the image.

* * * * *